United States Patent Office 3,307,749
Patented Mar. 7, 1967

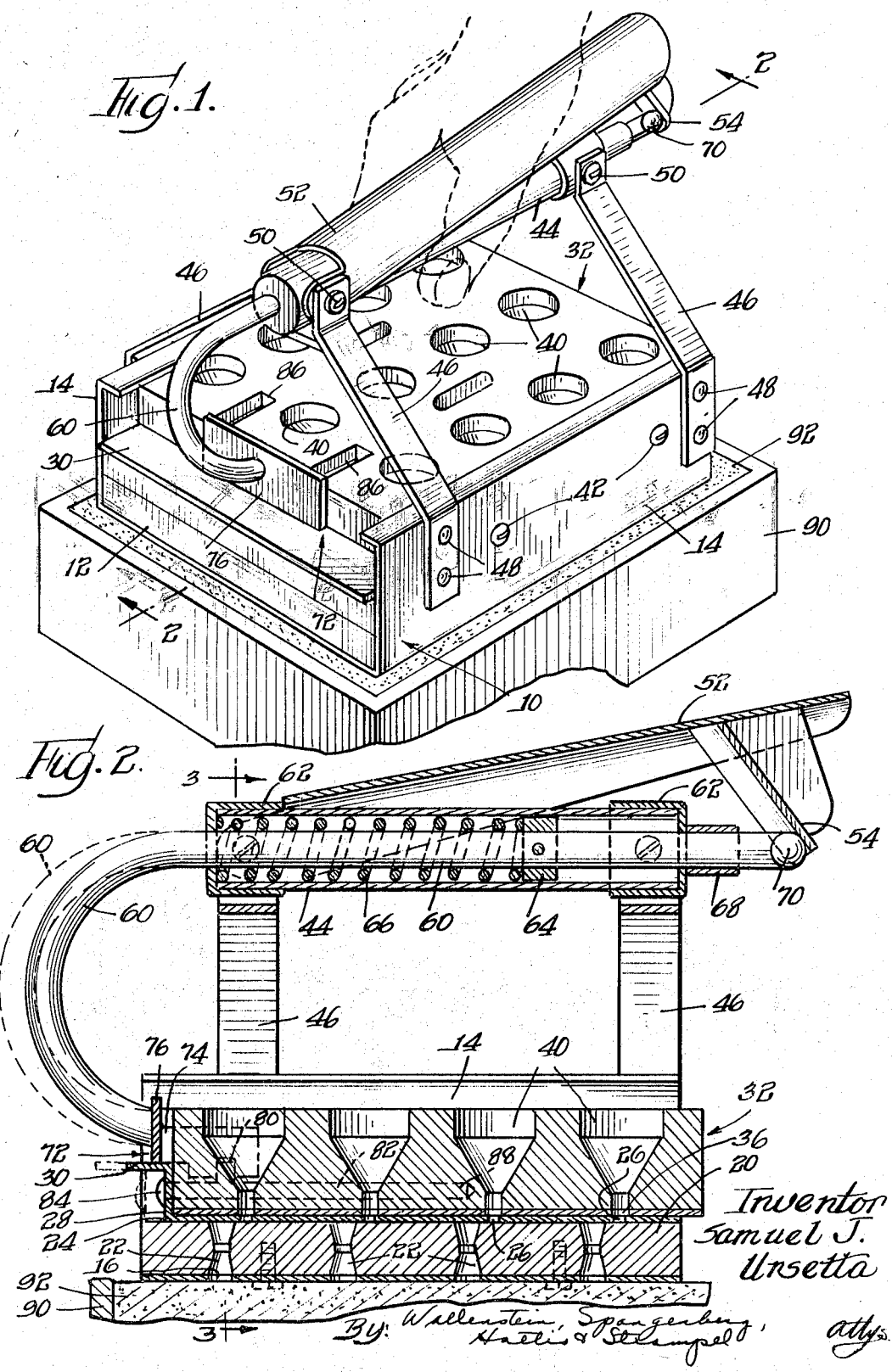

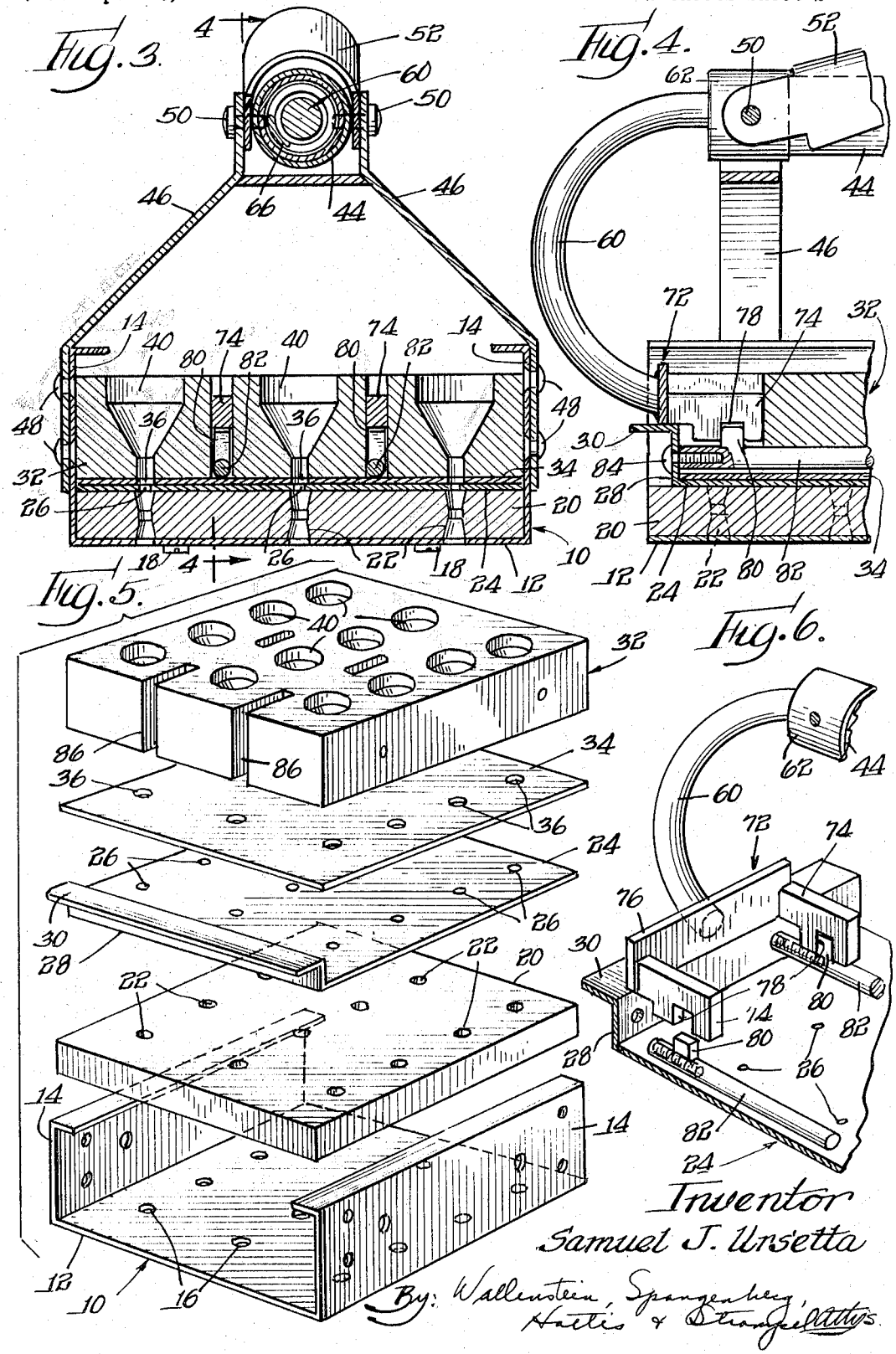

3,307,749
APPARATUS FOR SOWING SEEDS
Samuel J. Ursetta, 3200 S. Wells, Chicago, Ill. 60616
Filed Apr. 9, 1965, Ser. No. 446,813
5 Claims. (Cl. 222—276)

The present invention relates to apparatus for sowing seeds and, in particular, to apparatus for sowing a controlled quantity of seeds in flats, beds, or the like, of the type commonly utilized by florists and greenhouse keepers.

Apparatus heretofore has been developed for sowing seeds in controlled quantities in flats, for example. However, such apparatus has not, so far as is known, been accorded any appreciable acceptance by florists or greenhouse keepers. A factor believed responsible in large measure for the lack of interest in apparatus of this type has been the cumbersome, unwieldy character of such apparatus. Usually, the weight and structural features of the apparatus require the user to employ both hands in conveying the apparatus from one flat, for instance, to the next. The length and width, furthermore, of conventional seed sowing apparatus of the type here under consideration usually is greater than the corresponding dimensions of the flat. This characteristic of such apparatus requires the user to exercise care in centering the apparatus over the soil in the flat so that the seeds will be sowed in the proper area of the flat. Whether these shortcomings of conventional flat seeding apparatus are, or are not, the principal reasons for the continuing practice by numerous greenhouse keepers of hiring large numbers of laborers to manually seed flats, and the like, it is clear that such apparatus has not heretofore satisfied the needs of the industry.

In accordance with the present invention, apparatus for sowing seeds in flats, for example, is provided which overcomes the aforestated disadvantages of conventional flat seeding apparatus, and enables a florist or greenhouse keeper to seed flats in minimal time with minimum labor requirements. The apparatus is light in weight, and is easily and readily operated, and conveyed, by one hand of the user. The dimensions of the apparatus are such that it can be positioned in the confines of a flat, for instance, immediately over, or in contact with, the soil in the flat. While the apparatus can be adapted to sow substantially any sized seed, it is particularly suitable for sowing small sized seeds of the petunia variety. Generally speaking, even with experienced labor, it is difficult to control the number of such small sized seeds sowed in a flat. When the seeds sprout, the seedlings must be separated or "thinned." The amount of time required for this procedure will depend on the number of seeds sowed in the flat. Since "thinning" must be performed by hand, in the interest of minimizing labor costs, it is desirable to disperse the seeds in a predetermined spaced pattern in the soil of the flat and to avoid bunching the seeds in each area of the spaced pattern. As indicated, this goal is difficult to attain even with experienced labor, and greatly slows the task of sowing small sized seeds. The apparatus of the present invention effectively overcomes this difficulty and enables seeds of this type to be quickly and efficiently sowed in optimum quantities in a predetermined spaced pattern. Thus, not only does the apparatus of this invention substantially reduce labor costs, it also decreases seed costs due to the fact that it uniformly and automatically sows only optimum quantities of seeds.

The objectives of the present invention are achieved with apparatus which, briefly, comprises a base plate, an upped plate, and a slidable intermediate plate. The base plate has a plurality of spaced, open-ended, seed-receiving compartments, the lower open ends of which are not in register with the openings through the base plate. The slidable intermediate plate also has a plurality of spaced openings therethrough which in one position of the slidable plate are in register with the lower open ends of the compartments in the upper plate and which in another position of the slidable plate are in register with the openings through the base plate. A hand operable lever is provided for the apparatus for gripping, positioning and operating the apparatus. The lever is pivotally mounted above the upper plate in spaced relation thereto and is provided with a cam which abuts a ball secured at one end of a spring-biased plunger. The other end of the plunger is secured to a bracket arrangement which is attached to the slidable intermediate plate. When the lever is squeezed by the hand of the user, the cam exerts a force against the ball on the plunger causing the plunger to move in a manner to bring the openings through the slidable plate out of register with the lower open ends of the compartments in the upper plate and into register with the openings through the base plate thereby to cause limited quantities of seeds from the compartments in the upper plate to be transferred by the slidable plate to the openings in the base plate and ultimate deposition in the preselected spaced pattern in the soil contained in a flat or the like.

These and other objects, advantages and features of the present invention will become evident after considering the description hereinafter set forth in conjunction with the drawings annexed hereto wherein:

FIG. 1 is a view in perspective of an embodiment of the apparatus of the present invention being inserted into a flat for sowing seeds therein;

FIG. 2 is a vertical sectional view taken along line 2—2 of FIG. 1;

FIG. 3 is a vertical sectional view taken along line 3—3 of FIG. 2;

FIG. 4 is fragmentary vertical sectional view taken along line 4—4 of FIG. 3;

FIG. 5 is an exploded view of the support frame and associated plates of the embodiment of the invention illustrated in FIG. 1; and FIG. 6 is a fragmentary perspective view, partly in section, illustrating the connection between the actuating mechanism and the slidable plate of said embodiment.

Referring, now, more particularly to the drawings, the embodiment of the apparatus of the present invention illustrated includes a metal frame 10 having a bottom wall 12 and a pair of opposed, upwardly extending side walls 14—14. As shown in FIG. 5, the bottom wall 12 of the frame 10 has a plurality of longitudinally and transversely aligned openings 16 therethrough arranged in a preselected spaced pattern. Secured, as by wood screws 18—18, to the upper face of the bottom wall 12 is a base plate 20 desirably fabricated of wood. The base plate 20 has a plurality of longitudinally and transversely aligned openings 22 therethrough which are in register with the openings 16 in the bottom wall 12 of the frame 10.

Positioned on the upper surface of the base plate 20 is an intermediate slidable plate 24 desirably fabricated of metal. The slidable plate 24 has a plurality of openings 26 therethrough advantageously arranged in accordance with the preselected spaced pattern of the openings 16 and 22 of the bottom wall 12 and the base plate 20, respectively. The openings 26 in the slidable plate 24 normally are out of register with the openings 16 and 22. One end of the slidable plate 24 is joined to an upwardly extending wall portion 28 which, in turn, at its upper edge is joined to a horizontal, outwardly extending lip portion 30. The function of the portion 28 and 30 of the slidable plate 24 will become clear as the description proceeds.

Located above the slidable plate 24 is an upper plate 32 desirably made of wood. The plate 32 has a metal plate 34 secured to its lower surface which rests on the upper surface of the slidable plate 24 and facilitates the sliding movement of the plate 24 relative to the upper plate 32. The plate 34 has a plurality of openings 36 therethrough, and the upper plate 32 has a plurality of open-ended, funnel-shaped, seed-receiving compartments 40, the openings 36 and the compartments 40 being arranged in accordance with the aforedescribed preselected spaced pattern. The plate 32, together with the plate 34, are secured within the side walls 14—14 by means of wood screws 42—42 in a manner such that the lower open ends of the compartments 40 and the openings 36 normally are in register with the openings 26 through the slidable plate 24 but not in register with the openings 22 and 16 in the base plate 20 and the bottom wall 12 of the frame 10, respectively. The relationship and structural characteristics of the frame 10 and the plates 20, 24, 32 and 34 are clearly shown in FIG. 5 of the drawings.

Secured above and in spaced relation with respect to the upper plate 32 is an elongated, horizontally and longitudinally disposed, substantially cylindrical housing 44. The housing 44 desirably is maintained in position by spaced paired sets of upwardly extending brackets 46—46 which are attached at their lower ends to the outside of the walls 14—14 of the frame 10 by suitable fastening means such as rivets 48—48. The upper ends of each set of the brackets 46—46 are secured to the housing 44 by two pairs of bolts 50—50. A lever 52 is pivotally mounted at one of its ends on the housing 44 by means of one pair of the bolts 50—50. The lever 52, at its free end, advantageously is provided with a downwardly and outwardly extending cam 54 the function of which will be made clear hereinafter.

The housing 44 carries a rod or plunger 60, the ends of which extend through openings in end caps 62—62 of the housing 44. Internally of the housing 44, the plunger 60 is provided with a fixed collar 64 against which one end of a compression spring 66 abuts. The other end of the spring 66 is in contact with the end wall of the forward end cap 62 of the housing 44. A bearing 68, for the plunger 60, is secured to the rearward end cap of the housing 44.

The plunger 60 desirably carries a ball 70 which is urged against the cam 54 of the lever 52 by the compression spring 66 and maintains the lever 52 in the position shown in FIG. 2. The other end of the plunger 60 is curved downwardly and is secured to a bracket 72 having inwardly extending arms 74—74 joined to a cross-bar 76. See FIG. 6. The arms 74—74 are provided with notches or slots 78—78 which receive upwardly extending projections 80—80 joined to a pair of guide pins or rods 82—82 which are secured at one of their ends to the inner face of the portion 28 of the plate 24 by suitable fastening means such as screws 84—84. The lower edge of the cross-bar 76 of the bracket 72 rests on the upper surface of the portion 30 of the plate 24, and the arms 74—74 of the bracket 72 are received in grooves or slots 86—86 in the upper plate 32 to prevent the projections 80—80 of the rods 82—82 from being disengaged from the slots 78—78 of the arms 74—74. The free ends of the guide rods 82—82 extend into elongated grooves 88—88 in the upper plate 32.

Referring now, in particular, to FIG. 1 of the drawings, the embodiment of the apparatus of this invention hereinabove described is shown being used to sow seeds in a flat 90 containing soil 92. In order to use the apparatus to perform such an operation, the user must first place a quantity of seeds in the compartments 40 of the upper plate 32. Since the openings 26 in the slidable plate 24 are in register with the lower open ends of the compartments 40 and are not in register with the openings 22 in the base plate 20, the openings 26, and the upper surface of the base plate 20 immediately under the openings 26, form small, shallow containers for a portion of the seeds in the compartments 40. Depending upon the size of the seeds, the number of seeds passing into each of these small, shallow containers will vary. With very small seeds such as those of the petunia variety, from about 2 to 5 seeds will usually pass into each of the openings 26 in the plate 24.

After the seeds have been placed in the compartments 40, it is merely necessary for the user to grasp the apparatus with one hand, as illustrated, position the apparatus within the confines of the side walls of the flat 90, either holding the bottom wall 12 of the frame 10 just above the soil 92 in the flat or resting it lightly on the soil, and to then apply pressure to the lever 52 by squeezing his hand to force the lever 52 downwardly to cause the cam 54 to ride against the ball 70 carried by the plunger 60. As the cam 54 moves in a downward direction, the plunger 60 is made to move in a longitudinal direction against the bias of the spring 66. Movement of the plunger 60 causes the slidable plate 24 to move in the same longitudinal direction, bringing the openings 26 out of register with the lower open ends of the compartments 40 and into register with openings 22 and 16 in the base plate 20 and the bottom wall 12, respectively. As the plate 24 slides, the seeds in the openings 26 thereof, of course, are carried along, and drop to the soil in the flat in the preselected spaced pattern. Pressure on the lever 52 is then released by the user and the apparatus is ready to sow seeds in another flat. The entire operation can be performed quickly and with a minimum of effort on the part of the user.

While for the purposes of illustrating and describing the present invention a specific embodiment has been shown, it is to be understood that modifications may be made therein without departing from the spirit of the invention and scope of the appended claims.

What is claimed is:

1. A portable, hand manipulated apparatus for sowing seeds in a preselected spaced pattern in a flat or the like, comprising a base plate having a plurality of spaced openings therethrough arranged in accordance with the preselected spaced pattern, an upper plate above and connected to said base plate having a plurality of open-ended, seed-receiving compartments, the lower open ends of said compartments being out of register with the openings through the base plate, an intermediate plate slidably mounted between said base plate and said upper plate and having a plurality of spaced openings therethrough which in one position of said intermediate plate are in register with the lower open ends of the compartments in the upper plate, and which in another position of said intermediate plate are in register with the openings through the base plate, and hand operable means connected to the base plate and upper plate and located above the upper plate for gripping by one hand of an operator and manually positioning the apparatus, said hand operable means including manually operated cam operable means connected to the intermediate plate, said cam operable means in response to a force applied to said hand operable means being adapted to move in a linear direction substantially along the horizontal plane of the upper plate and to cause the intermediate plate correspondingly to move thereby to bring the openings through the intermediate plate out of register with the lower open ends of the compartments in the upper plate and into register with the openings through the base plate whereby limited quantities of seeds from the compartments in the upper plate are transferred to the openings in the base plate and deposited in a preselected spaced pattern in soil contained in a flat or the like, said apparatus being easily raised and moved from one flat, or the like, to the next and actuated by the one hand of an operator gripping the hand operable means.

2. A portable, hand manipulated apparatus for sowing seeds in a preselected spaced pattern in a flat or the like, comprising a base plate having a plurality of spaced openings therethrough arranged in accordance with the preselected spaced pattern, an upper plate above and connected to said base plate having a plurality of open-ended, seed-receiving compartments, the lower open ends of said compartments being out of register with the openings through the base plate, an intermediate plate slidably mounted between said base plate and said upper plate and having a plurality of spaced openings therethrough which in one position of said intermediate plate are in register with the lower open ends of the compartments in the upper plate, and which in another position of said intermediate plate are in register with the openings through the base plate, and a hand operable lever connected to the base plate and upper plate and located above the upper plate for gripping by one hand of an operator and manually positioning the apparatus, said hand operable lever carrying manually operated cam operable means connected to the intermediate plate, said cam operable means in response to a force applied to the lever being adapted to move in a linear direction substantially along the horizontal plane of the upper plate and to cause the intermediate plate correspondingly to slide between the upper plate and the base plate thereby to bring the openings through the intermediate plate out of register with the lower open ends of the compartments in the upper plate and into register with the openings through the base plate whereby limited quantities of seeds from the compartments in the upper plate are transferred to the openings in the base plate and deposited in a preselected spaced pattern in soil contained in a flat or the like, said apparatus being easily raised and moved from one flat, or the like, to the next and actuated by the one hand of an operator gripping the hand operable lever.

3. A portable, hand manipulated apparatus for sowing seeds in a preselected spaced pattern in a flat or the like, comprising a base plate having a plurality of spaced openings therethrough arranged in accordance with the preselected spaced pattern, an upper plate above and connected to said base plate having a plurality of open-ended, seed-receiving compartments, the lower open ends of said compartments being out of register with the openings through the base plate, an intermediate plate slidably mounted between said base plate and said upper plate and having a plurality of spaced openings therethrough which in one position of said intermediate plate are in register with the lower open ends of the compartments in the upper plate, and which in another position of said intermediate plate are in register with the openings through the base plate, and hand operable means connected to the base plate and upper plate and located above the upper plate for gripping by one hand of an operator and manually positioning the apparatus, said hand operable means carrying manually operated cam means in contact with a plunger, said plunger being connected to the intermediate plate and being adapted in response to a force applied to said hand operable means to move in a linear direction substantially along the horizontal plane of the upper plate and to cause the intermediate plate correspondingly to slide between the upper plate and the base plate thereby to bring the openings through the intermediate plate out of register with the lower open ends of the compartments in the upper plate and into register with the openings through the base plate whereby limited quantities of seeds from the compartments in the upper plate are transferred to the openings in the base plate and deposited in a preselected spaced pattern in soil contained in a flat or the like, said apparatus being easily raised and moved from one flat, or the like, to the next and actuated by the one hand of an operator gripping the hand operable means.

4. A portable, hand manipulated apparatus for sowing seeds in a preselected spaced pattern in a flat or the like, comprising a base plate having a plurality of spaced openings therethrough arranged in accordance with the preselected spaced pattern, an upper plate above and connected to said base plate having a plurality of open-ended, seed-receiving compartments, the lower open ends of said compartments being out of register with the openings through the base plate, an intermediate plate slidably mounted between said base plate and said upper plate and having a plurality of spaced openings therethrough which in one position of said intermediate plate are in register with the lower open ends of the compartments in the upper plate, and which in another position of said intermediate plate are in register with the openings through the base plate, and a hand operable lever secured to brackets connected to said base plate and upper plate and located above the upper plate for gripping by one hand of an operator and manually positioning the apparatus, said hand operable lever carrying manually operated cam operable means in contact with a spring biased plunger, said plunger at one end carrying holding means connected to the intermediate plate, said cam operable means being adapted in response to a force applied to the lever to move said plunger in a linear direction substantially along the horizontal plane of the upper plate and to cause said holding means correspondingly to move between the upper plate and the base plate thereby to bring the openings through the intermediate plate out of register with the lower open ends of the compartments in the upper plate and into register with the openings through the base plate whereby limited quantities of seeds from the compartments in the upper plate are transferred to the openings in the base plate and deposited in a preselected spaced pattern in soil contained in a flat or the like, said apparatus being easily raised and moved from one flat, or the like, to the next and actuated by the one hand of an operator gripping the hand operable lever.

5. A portable, hand manipulated apparatus for sowing seeds in a preselected spaced pattern in a flat or the like, comprising a frame having a bottom wall provided with a plurality of spaced openings therethrough arranged in accordance with the preselected spaced pattern and a pair of upwardly extending side walls, a base plate mounted on the bottom plate of the frame between the side walls thereof, said base plate having a plurality of spaced openings therethrough which are in register with the openings in the bottom wall of the frame, an upper plate above said base plate and secured between the side walls of the frame, said upper plate having a plurality of open-ended, funnel-shaped, seed-receiving compartments, the lower open ends of said compartments being out of register with the openings through the base plate and the bottom wall of the frame, an intermediate plate slidably mounted between the base plate and the upper plate and having a plurality of spaced openings therethrough which in one position of said intermediate plate are in register with the lower open ends of the compartments in the upper plate, and which in another position of said intermediate plate are in register with the openings through the base plate, a substantially cylindrical, horizontally disposed housing secured above the upper plate to a pair of spaced, upwardly extending brackets attached to the side walls of the frame, a hand operable lever pivotally mounted at one end to the housing, said lever at its free end carrying a downwardly extending cam, a spring-biased plunger carried in said housing, one end of said plunger engaging said cam and the other end of said plunger carrying a bracket having arms for engaging pins secured to the intermediate plate whereby a force applied to the lever against the spring-biased plunger will be transmitted to the intermediate plate for sliding the openings through the intermediate plate out of register with the lower open ends of the compartments in the upper plate and into register with the openings through the base plate and the bottom wall of the frame thereby to cause limited quantities of seeds from the compartments in the upper plate to be transferred to the openings in the base plate and the bottom wall of the frame to be deposited in a preselected spaced pattern in soil contained in a flat or the like.

References Cited by the Examiner

UNITED STATES PATENTS

| | | | |
|---|---|---|---|
| 829,839 | 8/1906 | Brownell | 222—276 |
| 1,343,924 | 6/1920 | McCorkle | 222—276 X |
| 2,405,507 | 8/1946 | Lefren | 222—137 |
| 2,590,596 | 3/1952 | Ziskin et al. | 222—473 |
| 3,073,486 | 1/1963 | Ratcliffe | 222—276 X |

ROBERT B. REEVES, *Primary Examiner.*

STANLEY H. TOLLBERG, *Examiner.*